United States Patent
Savatsky et al.

(10) Patent No.: US 11,459,408 B2
(45) Date of Patent: Oct. 4, 2022

(54) METHODS FOR SCALE-UP FROM A PILOT PLANT TO A LARGER PRODUCTION FACILITY

(71) Applicant: ExxonMobil Chemical Patents Inc., Baytown, TX (US)

(72) Inventors: Bruce J. Savatsky, Kingwood, TX (US); Ryan W. Impelman, Houston, TX (US); David F. Sanders, Beaumont, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 85 days.

(21) Appl. No.: 17/045,742

(22) PCT Filed: May 1, 2019

(86) PCT No.: PCT/US2019/030160
§ 371 (c)(1),
(2) Date: Oct. 6, 2020

(87) PCT Pub. No.: WO2019/217173
PCT Pub. Date: Nov. 14, 2019

(65) Prior Publication Data
US 2021/0024660 A1    Jan. 28, 2021

Related U.S. Application Data

(60) Provisional application No. 62/665,845, filed on May 2, 2018.

(51) Int. Cl.
*C08F 2/01* (2006.01)
*C08F 2/34* (2006.01)
*C08F 210/02* (2006.01)
*C08F 210/06* (2006.01)

(52) U.S. Cl.
CPC .............. *C08F 2/01* (2013.01); *C08F 210/02* (2013.01); *C08F 210/06* (2013.01); *C08F 2400/02* (2013.01); *C08F 2420/00* (2013.01); *C08F 2500/05* (2013.01); *C08F 2500/12* (2013.01)

(58) Field of Classification Search
None
See application file for complete search history.

(56) References Cited

U.S. PATENT DOCUMENTS

| | | | |
|---|---|---|---|
| 8,907,018 B2 * | 12/2014 | Bellehumeur | C08F 210/16 525/240 |
| 2002/0037979 A1 | 3/2002 | Job et al. | |
| 2008/0275197 A1 * | 11/2008 | Coffy | C08F 210/16 526/65 |
| 2011/0034645 A1 * | 2/2011 | Standaert | C08J 5/18 526/351 |
| 2019/0169335 A1 | 6/2019 | Savatsky et al. | |

FOREIGN PATENT DOCUMENTS

EP    00051945 A2    5/1982

* cited by examiner

*Primary Examiner* — Fred M Teskin
(74) *Attorney, Agent, or Firm* — ExxonMobil Chemical Patents Inc.—Law Department

(57) ABSTRACT

Methods for scale-up from a pilot plant to full production of a bimodal polymer product having a density, melt index, and a melt index ratio are provided herein. The methods provide for adjusting reactor conditions and catalyst ratio of a bimodal catalyst system to optimize the transition from single catalyst to bimodal polymer compositions on a full-scale process plant consistent with pilot plant development.

17 Claims, No Drawings

METHODS FOR SCALE-UP FROM A PILOT PLANT TO A LARGER PRODUCTION FACILITY

CROSS-REFERENCE OF RELATED APPLICATIONS

This application is a National Phase Application claiming priority to PCT Application Serial No. PCT/US2019/030160, filed May 1, 2019, which claims the benefit to Ser. No. 62/665,845, filed May 2, 2018, the disclosures of which are hereby incorporated by reference in their entirety.

FIELD OF THE INVENTION

The present disclosure generally relates to gas phase polyethylene polymerization using a single catalyst system and/or a dual catalyst system and more specifically, to methods for scale-up from a pilot plant to larger polymer production facilities.

BACKGROUND OF THE INVENTION

Pilot plants are useful in simulating larger polymer production facilities. In a pilot plant, an operator can experiment, investigate and troubleshoot production problems without the risk and expenses associated with larger scale productions.

For production and control of bimodal polymer in a single reactor, the process conditions are varied to produce resin having a specific melt index (MI or 12 using the 2.16 kg weight) and density. However, for a bimodal or multi-modal (i.e., terpolymer) polymer, both the properties of each polymer as well as mixture concentration of two or more polymers (i.e., a high molecular weight polymer and a low molecular weight polymer) are a function of the two or more types of catalysts used sometimes referred to as a bimodal catalyst system, mixed catalyst system, or dual catalyst system. For purposes here, these terms shall be used interchangeably to mean the same thing.

Therefore, while various reactor conditions (i.e., the partial pressures of ethylene, hexene-1, and hydrogen, reactor temperature and residence time) can be adjusted to provide an overall melt index and density in product, the mixture as defined by the split (weight % of the high molecular weight polymer) must be consistent. If the split is not consistent, a product having identical MI and density can be produced with incorrect polymer property requirements.

Producing a multimodal polymer in a single reactor offers added degrees of freedom. For example, the polymer split is controlled by amount and reaction rate of each catalyst in the reactor. But this can cause uncertainties in defining the exact conditions to produce the required overall polymer MI and density as well as in providing end-product property requirements. Currently, the actual split of the polymer cannot be measured in a simple real-time measurement. While the bimodality of the polyethylene product can be analyzed by known analytical methods (i.e., GPC (Gel Permeation Chromatography)), combined with TREF (Temperature Rising Elution Fractionation) to measure the molecular weight distributions, the polymer split and the comonomer incorporation, these analytical techniques are time consuming and not typical of measurements at manufacturing QC (Quality Control) laboratories which typically rely on standard ASTM type polymer analysis (i.e., MI, density, MIR, where MIR=I21/I2 where I21 is the MI using the 21.6 kg weight and I2 uses the 2.16 kg weight).

Prior to producing a new polyethylene composition in a commercial reactor, basic data is first developed at a smaller experimental scale to obtain the specific reactor conditions and combinations of catalysts required. But, for various reasons, the scale-up from pilot plant to larger production facilities or commercial plants cannot be perfectly performed. For example, when scaling-up for commercial processing, offsets in set points must be established for process conditions, even though abundant efforts might have been expended on calibration.

For a polymer produced with a single catalyst, this issue is not of major concern because scale-up is relatively straightforward. However, with a multi-modal polymer, if the MI is too low, then it is not known what to adjust because there are multiple adjustments that can be made such as a hydrogen off set or the polymer split. To compound matters, the polymer split might be off target due to several issues including, but not limited to: (1) the concentration of each of the bimodal catalysts inside the reactor; (2) the effect of a particular catalyst poison or combination of poisons that might preferentially deactivate one of the catalysts relative to the other; (3) off sets in the flow meters that are used to control the flow of each of the catalysts; (4) a multitude of variables relating to the manufacture of the catalysts; and/or (5) other reactor process conditions that might affect one catalyst relative to the other (i.e., reactor residence time, isopentane concentrations, reactor temperature and ethylene partial pressure). Any change to any of these conditions can affect the polymer MI while the polymer product composition at target MI and density might not be what is desired.

On the other hand, for a single catalyst system, offsets are often determined when the polymer measurements are not as expected from pilot plant data. In the single catalyst system, adjusting the reactor conditions to achieve the product can be straightforward, as offsets are determined by the QC lab measurements of the polymer properties (including melt index, density, and melt index ratio), which allows for decisions as to what reactor process conditions are adjusted and may be different than expected from the pilot plant data. Reactor conditions can be adjusted to achieve the correct product grade and this process can be straightforward.

However, for the bimodal polymer, the percentage of high molecular weight polymer is unknown and may change if there are offsets in any number of process conditions. As such, process conditions developed in the pilot plant or laboratory scale and adjusted upon scale-up to a larger production facilities can change the mixture composition of the bimodal polymer product.

A need exists, therefore, for new methodology to maintain the mixture concentration of the bimodal polymer product upon scale-up to larger production facilities.

SUMMARY OF THE INVENTION

Methods for scale-up from a pilot plant to a larger production facility of a bimodal polymer product having a density and a melt index are provided herein. In addition, the present methods can be used in subsequent commercial polyethylene manufacturing campaigns at the same commercial scale facility or at a different location, where due to time or similar of other off-sets, the transitioning causes uncertainties in knowing what conditions to adjust to achieve aim grade target properties.

As described herein, the present methodologies comprise the steps of: (1) producing a bimodal polymer product in a first reactor in a pilot plant with a bimodal catalyst system under a first set of operating conditions; (2) producing a single catalyst polymer composition in the first reactor in the pilot plant with a single catalyst system under a second set of operating conditions; (3) producing the single catalyst polymer composition in a second reactor in a larger production facility with the single catalyst system, where the second set of operating conditions to produce the single catalyst polymer composition are adjusted to provide a third set of operating conditions; (4) determining a fourth set of operating conditions, where each operating condition of the fourth set of operating conditions equals a ratio of that operating condition as set in the third set of operating conditions to the operating condition of the second set of operating conditions, and the operating condition of the first set of operating conditions to the operating condition of the second set of operating conditions; and (5) transitioning the second reactor from the single catalyst system to the bimodal catalyst system under a fourth set of operating conditions to produce the bimodal polymer product. The present methods further include the optional step of adjusting the amounts of the first catalyst component and the second catalyst component to produce the bimodal polymer product.

As described herein, in the present methods, the bimodal catalyst system comprises a first catalyst and a second catalyst and the bimodal polymer product has a bimodal polymer product density and a bimodal polymer product melt index. The single catalyst polymer composition has a single catalyst polymer composition density and a single catalyst polymer composition melt index. The single catalyst polymer composition is produced in the first reactor before or after the step of producing the bimodal polymer product in the first reactor.

Further described are methods for scale-up from a pilot plant to a larger production facility of a bimodal polymer product having a density and a melt index comprising the steps of: (1) determining a first set of operating conditions to produce the bimodal polymer product in a first reactor in the pilot plant with a bimodal catalyst system; (2) determining a second set of operating conditions to produce a single catalyst polymer composition in a first reactor in the pilot plant with single catalyst system; (3) scaling-up the production of the bimodal polymer product from the pilot plant to a larger production facility; (4) transitioning the second reactor from the single catalyst system to the bimodal catalyst system to produce the bimodal polymer product under the fourth set of operating conditions; and (5) adjusting the ratio of the first catalyst component to the second catalyst component to maintain the bimodal polymer product melt index and the bimodal polymer product density.

In the subject methods, the larger production facility may have a second reactor that the uses the single catalyst system under the second set of operating conditions, and the second set of operating conditions are modified to a third set of operating conditions to produce the single catalyst polymer composition. Each of the operating conditions of the fourth set of operating conditions equals a ratio of the operating condition of the third set of operating conditions to the operating condition of the second set of operating conditions and the operating condition of the first set of operating conditions to the operating condition of the second set of operating conditions.

In the present methods, the single catalyst polymer composition has a single catalyst composition density and a single catalyst composition melt index. Further, the single catalyst composition density is the same as the bimodal product density and the single catalyst composition melt index is the same as the bimodal product melt index.

In an aspect, the methodologies for scale-up from a pilot plant to a larger production facility of a bimodal polymer product having a density and a melt index can comprise the steps of: (1) determining a first set of operating conditions in a first reactor in the pilot plant with a single catalyst system to produce a single catalyst polymer composition, where the single catalyst system comprises a metallocene catalyst; (2) transitioning the first reactor from the single catalyst system to a bimodal catalyst system under a second set of operating conditions to produce a bimodal polymer product, wherein the bimodal catalyst system comprises two metallocene catalysts wherein the melt index and density of the single catalyst polymer composition is the same as the bimodal polymer product; (3) scaling-up the production of the polymer product from the pilot plant to a larger production facility under the first set of operating conditions, where the larger production facility has a second reactor that uses the single catalyst system; (4) adjusting the first set of operating conditions and determining the offset; and (5) transitioning the second reactor from the single catalyst system to the bimodal catalyst system to produce the bimodal polymer product with the offset in the first set of operating conditions. As an optional step, the ratio of the first catalyst to the second catalyst may be adjusted to maintain the melt index and density of the bimodal polymer product.

Operating conditions used in the present methods can include, but are not limited to, an H2/C2 reactor gas ratio, a C6/C2 reactor gas ratio, a C6/C2 reactor feed ratio, reactor residence time (residence time=bed weight per polymer rate), and an isopentane concentration. The present methods can further comprise the step of maintaining constant or adjusting the C6/C2 reactor gas ratio and/or the C6/C2 reactor feed ratio during the step of transitioning the first reactor from the bimodal catalyst system to a single catalyst system under the first set of operating conditions to produce a first polymer composition.

In an aspect, the present methods may further comprise the step of attaining a steady state of the first reactor to determine one or more polymer grade properties for the first polymer composition. In an aspect, the one or more polymer grade properties comprise melt index, melt index ratio and/or density. In an aspect, the polymer grade properties can be used to delineate a bimodal polymer composition for the bimodal polymer product. In an aspect, the C6/C2 ratio can control an amount of hexene incorporated into the bimodal polymer product. In an aspect, the first catalyst is a metallocene catalyst. In an aspect, the second catalyst is a conventional type catalyst. As provided herein, the bimodal catalyst system can include at least one metallocene catalyst component and at least one non-metallocene component (sometimes referred to as conventional catalyst component), or two metallocene catalyst components, or two conventional catalysts components. Further, the bimodal polymer product may be referred to as a multi-catalyst composition. In an aspect, the bimodal polymer product is a polyethylene-based polymer or a polypropylene-based polymer.

DETAILED DESCRIPTION

Before the present compounds, components, compositions, and/or methods are disclosed and described, it is to be understood that unless otherwise indicated, this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a", "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term "catalyst system" refers to at least one "catalyst component" and at least one "activator", or, alternatively, at least one cocatalyst. The catalyst system may also include other components, such as supports, and is not limited to the catalyst component and/or activator alone or in combination. The catalyst system may include any number of catalyst components in any combination as described, as well as any activator in any combination as described.

As used herein, the terms "scale-up" or "scaling-up" a polymerization process refers to the steps required between an initial process design in the laboratory and completion of a final production plant (also referred to herein as a "larger production facility," a "commercial plant," or a "full-scale process plant").

The term "catalyst component" refers to any compound that, once appropriately activated, is capable of catalyzing the polymerization or oligomerization of olefins. Preferably, the catalyst component includes at least one Group 3 to Group 12 atom and optionally at least one leaving group bound thereto.

The term "leaving group" refers to one or more chemical moieties bound to the metal center of the catalyst component that can be abstracted from the catalyst component by an activator, thereby producing the species active towards olefin polymerization or oligomerization. Suitable activators are described in detail below.

The term "substituted" refers to the group following that term having at least one moiety in place of one or more hydrogens in any position, the moieties selected from such groups as halogen radicals (for example, $C_1$, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof.

The terms "metallocene" or "metallocene catalyst components" are used interchangeably and refer to "half sandwich" and "full sandwich" compounds having one or more substituted or unsubstituted cyclopentadienyl moiety (Cp) (typically two Cp moieties) bound to at least one Group 3 to Group 12 metal atom, and one or more leaving group(s) bound to at least one metal atom.

As used herein, Cp ligands are one or more rings or ring system(s), at least a portion of which includes 7-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron, aluminum and combinations thereof, wherein carbon makes up at least 50% of the ring members. Or the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof, and heterocyclic versions thereof.

The "Group 15-containing catalyst" can include Group 3 to Group 12 metal complexes, wherein the metal has a 2 to 8 coordinate, the coordinating moiety or moieties including at least two Group 15 atoms, and up to four Group 15 atoms. In an aspect, the Group 15-containing catalyst component is a complex of a Group 4 metal and from one to four ligands such that the Group 4 metal is at least a 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. Nos. 5,318,935, 5,889,128, 6,333,389 B2 and U.S. Pat. No. 6,271,325 B. In an aspect, the Group 15-containing catalyst includes Group 4 imino-phenol complexes, Group 4 bis(amide) complexes, and Group 4 pyridyl-amide complexes that are active towards olefin polymerization to any extent.

The term "activator" refers to any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components are thus activated towards olefin polymerization using such activators. Examples of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

Lewis acids can be used to activate the metallocenes described. Illustrative Lewis acids include, but are not limited to, alumoxane (e.g., methyl alumoxane or methyl aluminoxane, "MAO"), modified aluminoxane (e.g., "TIBAO"), and alkylaluminum compounds. Ionizing activators (neutral or ionic) such as tri (n-butyl)ammonium tetrakis(pentafluorophenyl)boron may be also be used. Further, a trisperfluorophenyl boron metalloid precursor may be used. Any of those activators/precursors can be used alone or in combination with the others.

MAO and other aluminum-based activators are known in the art. Ionizing activators are known in the art and are described by, for example, Eugene You-Xian Chen & Tobin J. Marks, Cocatalysts for Metal-Catalyzed Olefin Polymerization: Activators, Activation Processes, and Structure-Activity Relationships 100(4) Chemical Reviews 1391-1434 (2000). The activators may be associated with or bound to a support, either in association with the catalyst component (e.g., metallocene) or separate from the catalyst component, such as described by Gregory G. Hlatky, Heterogeneous Single-Site Catalysts for Olefin Polymerization 100(4) Chemical REVIEWS 1347-1374 (2000).

Illustrative Ziegler-Natta catalyst compounds are disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565, 5,518,973, 5,525,678, 5,288,933, 5,290,745, 5,093,415 and 6,562,905. Examples of such catalysts include those comprising Group 4, 5, or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

One type of conventional-type transition metal catalysts includes Ziegler-Natta catalysts currently known in the art. Other types of conventional-type catalysts include chromium catalysts. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that may be used include transition metal compounds from Groups 3 to 17, or Groups 4 to 12, or Groups 4 to 6 of the Periodic Table of Elements.

These conventional-type transition metal catalysts may be represented by the formula: MRx, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)C_3$, $Ti(OC_4H_9)_3Cl$, $Ti(OC_3H_7)_2C_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type cocatalyst compounds for the above conventional-type transition metal catalyst compounds may be represented by the formula $M_3M_{4v}X_{2c}R_{3b-c}$, wherein $M_3$ is a metal from Group 1 to 3 and 12 to 13 of the Periodic Table of Elements; $M_4$ is a metal of Group 1 of the Periodic Table of Elements; v is a number from 0 to 1; each $X_2$ is any halogen; c is a number from 0 to 3; each $R_3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M_3R_3k$, where $M_3$ is a Group IA, IIA, IIB or IIIA metal, such as lithium, sodium, beryllium, barium, boron, aluminum, zinc, cadmium and gallium; k equals 1, 2 or 3 depending upon the valency of $M_3$ which valency in turn normally depends upon the particular Group to which $M_3$ belongs; and each $R_3$ may be any monovalent radical that includes hydrocarbon radicals and hydrocarbon radicals containing a Group 13 to 16 element like fluoride, aluminum, oxygen or a combination thereof.

As provided herein, a bimodal catalyst system can include at least one metallocene catalyst component and at least one non-metallocene component (sometimes referred to as conventional catalyst component), or at least two different metallocene catalyst components, or two conventional catalysts components. As used herein, multi-modal catalyst systems mean and include a bimodal catalyst system and a tri-modal catalyst system. Further, the bimodal polymer product may be referred to as a multi-catalyst composition.

The terms "multi-catalyst composition" and "multi-catalyst" refer to any composition, mixture or system that includes two or more different catalyst components. These catalyst systems comprising two or more types of catalysts are sometimes referred to as a bimodal catalyst system, mixed catalyst system, or dual catalyst system. For purposes here, these terms shall be used interchangeably to mean the same thing.

As described herein, the catalyst system may be supported on a carrier, typically an inorganic oxide, or chloride or resinous material such as, for example, polyethylene or silica.

Suitable metallocene catalysts particularly include the silica-supported hafnium transition metal metallocene/methylalumoxane catalyst systems described in, for example, U.S. Pat. Nos. 6,242,545 and 6,248,845, particularly Example 1. Hafnium and zirconium transition metal metallocene-type catalyst systems are particularly suitable. Other particularly suitable metallocene catalysts include those metallocene catalysts and catalyst systems described in, U.S. Pat. Nos. 5,466,649; 6,476,171; 6,225,426, and 7,951,873, and in the references cited therein, all of which are fully incorporated herein by reference.

As provided herein, melt index is determined according to ASTM D-1238-E (190° C./2.16 kg), also sometimes referred to as $I_2$ or $I_{2.16}$. A melt index value measured with a slightly larger amount of weight is referred to as Is, determined in the same manner as $I_2$, except using 5.0 kg (190° C./5.0 kg).

Flow Index is also determined according to ASTM D-1238-E but at a temperature of 190° C. using a 21.6 kg mass (i.e., 190° C./21.6 kg).

The Melt Index Ratio ("MIR") is the ratio of I21/I2 and provides an indication of the amount of shear thinning behavior of the polymer and is a parameter that might be correlated to the overall polymer mixture molecular weight distribution data obtained separately by using GPC and possibly in combination with another polymer analysis including TREF.

In commercial gas phase polymerization processes, a gaseous stream containing one or more monomers can be passed through a fluidized bed under reactive conditions in the presence of a catalyst. A polymer product is withdrawn from the reactor while fresh monomer is introduced to the reactor to replace the removed polymerized product. Unreacted monomer and catalyst is withdrawn from the fluidized bed and recycled back to the reactor.

Commercial gas phase polymerization processes can operate in condensed mode. Condensed mode operation is achieved when a portion of the reactor cycle gas is condensed into liquids before the gas enters the bottom of the reactor. The reactor cycle gas is typically condensed by a combination of two things. The first is increasing the concentration of an induced condensing agent ("ICA"), usually isopentane, to increase the cycle gas dew point temperature. The second is increasing reactor rates to lower the temperature of the cycle gas below its dew point. As production rates increase, the cycle gas cooler lowers the cycle gas temperature to offset the heat of reaction and maintain a steady reactor temperature. The combination of the higher dew point temperature and the lower cycle gas temperature leads to condensation in the cycle gas. The condensed liquid is vaporized in the reactor, which removes more of the heat. As such, operating in condensed mode allows otherwise cooling-limited plants to increase production rates by improving system heat removal.

In developing a polymerization process to produce a particular grade of polymer product, there are a number of steps required between the initial concept and completion of the final production plant (also referred to herein as a commercial plant). These general steps include the development of the commercial process, optimization of the process, scale-up from the bench to a pilot plant, and from the pilot plant to the full-scale process. While the ultimate goal is to go directly from process optimization to full-scale process plant, the pilot plant is generally a necessary step. Reasons for this critical step include: understanding the potential waste streams, examination of macro-processes, process interactions, process variations, process controls, development of standard operating procedures, etc. The information developed at the pilot plant scale allows for a better understanding of the overall process including side processes. Therefore, the pilot plant can help build an information base so that the technology can be permitted and safely implemented.

Hence, the present methodology provides a method of scaling-up a polymerization process from a pilot plant to a full-scale process plant where the bimodal polymer product produced in the full-scale process plant has approximately the same density, melt index, melt index ratio, and mixture concentration of a first polymer component (typically a high molecular weight polymer) and a second polymer component (typically a lower molecular weight polymer) as the bimodal polymer product that was produced in the pilot plant. The present methodologies are also useful in transitioning the polymerization process from one commercial plant to another commercial plant. The bimodal polymer product comprises a first polymer component and a second polymer component. The first polymer component is sometimes referred to as the high molecular weight component. The second polymer component is sometimes referred to as the lower molecular weight component.

In the present methods, as a first step, the bimodal polymer product meeting the end-use product requirements is produced in a pilot plant using a bimodal catalyst system utilizing a first set of operating conditions. The bimodal catalyst system comprises a first catalyst component and a second catalyst component in a ratio. Then, in the first reactor in the pilot plant, a single catalyst composition is produced under a second set of operating conditions. In a second reactor in a commercial plant, the single catalyst polymer composition is produced with the second set of operating conditions. The second set of operating conditions is adjusted to provide a third set of operating conditions. A fourth set of operating conditions are then determined for each operating condition where the operating condition is equal to a ratio of the operating condition of the third set of operating conditions to the same operating condition of the second set operating conditions, and to the operating condition of the first set of operating conditions to the operating condition of the second set of operating conditions. The second reactor in the commercial plant is then transitioned from the single catalyst system to the bimodal catalyst system under the fourth set of operating conditions to produce the bimodal polymer product. The ratio of the first catalyst component to the second catalyst component of the bimodal catalyst system can be adjusted. The method steps described herein can further apply to a transition from a first reactor in a first commercial plant to a second reactor in a second commercial plant.

Operating conditions used to produce the bimodal polymer product can include, but are not limited to, a hydrogen-to-monomer gas ratio (i.e. a "H2/C2 reactor gas ratio" or "H2/C2 gas ratio"), a co-monomer/monomer gas composition (i.e., a "C6/C2 mole/mole ("mol/mol") gas composition"), a co-monomer/monomer feed ratio (i.e., a "C6/C2 feed ratio" or "C6/C2 reactor feed ratio"), a reactor residence time, an inducible condensing agent ("ICA") concentration and a residence time (i.e., a "bed weight/polymer rate"), the reactor temperature and also the ratio and amount of active catalysts. In producing the bimodal polymer product, a first set of operating conditions are established for the bimodal polymer product that has a particular melt index, melt index ratio and/or density.

As used herein, H2/C2 reactor gas ratio is the concentration of H2, normally measured in mol % or ppmv, depending on catalyst type, divided by the concentration of C2, normally measured in mol %, present in the reactor cycle gas. C6/C2 reactor gas ratio is the concentration of C6, normally measured in mol %, divided by the concentration of C2, normally measured in mol %, present in the reactor cycle gas. C6/C2 reactor feed ratio is the feed rate of C6, normally measured in kilograms or pounds per hour, divided by the feed rate of C2, normally measured in kilograms or pounds per hour. Note that the ratio includes both fresh feeds as well as recovered or recycled feeds if present. Reactor residence time, normally in units of hours, is defined as the bed mass, normally measured in tons or pounds, divided by the production rate normally measured in tons or pounds per hour. C2 partial pressure, normally in units of bar or psia, is defined as the concentration of C2 in the reactor cycle gas as a mol fraction multiplied by the absolute total reactor pressure.

Pilot Plants and Pilot Plant Reactor

Pilot plants are used to mimic commercial systems on a small scale. Pilot plants are cheaper to build and cheaper to operate. Pilot plants allow an operator a less expensive way to experiment, investigate and troubleshoot problems without the risks and expenses associated with larger scale productions. The main cycle gas stream of a pilot plant reactor can have a flow rate ranging from a low of about 100 lb./hr., about 15,000 lb./hr., or about 20,000 lb./hr. to a high of about 25,000 lb./hr., about 30,000 lb./hr., or about 50,000 lb./hr.

Pilot plant reactors, however, are not capable of operating in condensed mode because production rates and heat removal systems are limited. Pilot plant reactors operate with a bottom bell temperature that is higher than commercial-scale reactors. The inlet temperature of a pilot plant reactor is typically 17° F. below reactor temperature at full rates. This difference between the inlet temperature and reactor temperature is much lower than commercial-scale reactors, where inlet temperatures are typically about 40° F. to 85° F. below reactor temperature.

Larger Production Facilities

As used herein, the terms "larger (polymer) production facility," "commercial scale reactor," and "commercial reactor" are used interchangeably and refer to a reactor (referred to herein as a "second reactor") used in a full-scale process plant typically having at least a diameter of at least 14 feet, a bed height of at least 45 feet, and/or a production rate of at least 50,000 lbs. polymer per hour.

In a commercial reactor, the fluidized bed within the reactor housing has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor housing. To maintain a viable fluidized bed in the reactor housing, the superficial gas velocity through the bed must exceed the minimum flow required for fluidization. Preferably, the superficial gas velocity is at least two times the minimum flow velocity. Ordinarily, the superficial gas velocity ranges from about 1.0 ft./sec to about 5.0 ft./sec. The superficial gas velocity also can range from a low of about 1.0 ft./sec, about 1.5 ft./sec, about 2.0 ft./sec to a high of about 3.0 ft./sec, about 4.0 ft./sec, or about 5.0 ft./sec.

The amount of hydrogen in the reactor housing can be expressed as a mole ratio relative to the total polymerizable monomer, for example, ethylene or a blend of ethylene and one or more comonomers. The amount of hydrogen used in the polymerization process can be an amount necessary to achieve the desired flow index of the final polyolefin resin. The mole ratio of hydrogen to total monomer (hydrogen (or "$H_2$"): monomer) can range from 0.0001 to 0.0005; 0.001 to about 10; 0.001 to about 5; 0.001 to about 3; 0.001 to about 0.10. The amount of hydrogen in the reactor housing 110 also can be 0.001 up to 3,000 ppm, 4,000 ppm, or 5,000 ppm. The mole ratio of hydrogen to total monomer ($H_2$: monomer) also can range from 50 ppm to 5,000 ppm or 50 ppm to 2,000 ppm.

The total monomer concentration in the reactor housing can be at least 20 mole %, at least 60 mole %, at least 70 mole %, at least 80 mole %, at least 90 mole %, at least 95 mole %, at least 96 mole %, at least 97 mole %, at least 98 mole %, at least 99 mole %, at least 99.9 mole %, or at least 99.99 mole %. In an aspect, the reactor housing 110 can have an ethylene concentration of at least 20 mole %, at least 60 mole %, at least 70 mole %, at least 80 mole %, at least 90 mole %, at least 95 mole %, at least 96 mole %, at least 97 mole %, at least 98 mole %, at least 99 mole %, at least 99.9 mole %, or at least 99.99 mole %.

The rates are significantly less than typical commercial rates that are about 300,000 lb./hr. or 1,000,000 lb./hr. or more.

The reaction conditions within the reactor housing vary depending upon the monomers, catalysts and equipment availability. For example, the reaction temperature can range from about –10° C. to about 120° C., such as about 15° C. to about 110° C. The reaction pressure can range from about 0.1 bar to about 100 bar, or about 5 bar to about 50 bar, for example. The temperature and pressure of the main cycle gas stream leaving the reactor is nearly identical to that of the reaction conditions.

A cycle gas cooler can be any apparatus or system capable of decreasing the temperature of the main cycle gas stream. The cycle gas cooler can be used to lower the temperature of the main cycle gas by about 10° F., about 15° F., about 20° F., or about 30° F. The cycle gas cooler can be any one or more shell-and-tube, plate and frame, plate and fin, spiral wound, coil wound, U-tube, fans, and/or bayonet style heat exchangers. Illustrative heat transfer mediums can include, but are not limited to, water, air, glycols, mixtures thereof, or the like.

A cycle gas compressor can be used to increase the pressure of the cooled main cycle gas stream exiting the cooler. The pressure of the cooled main cycle gas stream exiting the cooler can vary greatly, and is typically 10, 15, 20, or 25 psi above the reactor pressure.

Catalyst Components and Catalyst System

The methods described herein are generally directed toward polymerization processes, particularly, gas phase processes, for polymerizing one or more monomers in the presence of a bimodal catalyst system.

The polymerization processes described herein may be continuous processes. As used herein, "a continuous process" is process that operates (or is intended to operate) without interruption or cessation, but may be interrupted for customary maintenance or for the occasional disrupting event. For example, a continuous process to produce a polymer would be one in which the reactants are continuously introduced into one or more reactors and polymer product is continually or semi-continually withdrawn.

In an aspect, the methods disclosed herein provide for a gas phase process for polymerizing one or more monomer(s) in the presence of at least one catalyst system and a condensable agent wherein the process is operated in a condensed mode.

Illustrative Ziegler-Natta catalyst compounds are disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565, 5,518,973, 5,525,678, 5,288,933, 5,290,745, 5,093,415 and 6,562,905. Examples of such catalysts include those comprising Group 4, 5, or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are traditional Ziegler-Natta catalysts. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that may be used include transition metal compounds from Groups 3 to 17, Groups 4 to 12, or Groups 4 to 6 of the Periodic Table of Elements.

These conventional-type transition metal catalysts may be represented by the formula: MRx, where M is a metal from Groups 3 to 17, a metal from Groups 4 to 6, a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})C_3$.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated. One example of the general method of preparation of such a catalyst includes the following: dissolve TiCl$_4$ in THF, reduce the compound to TiCl$_3$ using Mg, add MgCl$_2$, and remove the solvent.

Conventional-type cocatalyst compounds for the above conventional-type transition metal catalyst compounds may be represented by the formula M$_3$M$_{4v}$X$_{2c}$R$_{3b-c}$, wherein M$_3$ is a metal from Groups 1 to 3 or 12 to 13 of the Periodic Table of Elements; M$_4$ is a metal of Group 1 of the Periodic Table of Elements; v is a number from 0 to 1; each X$_2$ is any halogen; c is a number from 0 to 3; each R$_3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula M$_3$R$_3$k, where M$_3$ is a Group IA, IIA, IIB or IIIA metal, such as lithium, sodium, beryllium, barium, boron, aluminum, zinc, cadmium, or gallium; k equals 1, 2 or 3 depending upon the valency of M$_3$ which valency in turn normally depends upon the particular Group to which M$_3$ belongs; and each R$_3$ may be any monovalent radical that includes hydrocarbon radicals and hydrocarbon radicals containing a Group 13 to 16 element like fluoride, aluminum, oxygen or a combination thereof.

A bimodal catalyst system can be a "mixed catalyst system" and include at least one metallocene catalyst component and at least one non-metallocene component (referred to herein as conventional catalyst component). Alternatively, the mixed catalyst system can include two different metallocene catalyst components or two different conventional catalyst components.

A mixed catalyst system can be described as a bimetallic catalyst composition or a multi-catalyst composition. As used herein, the term "bimetallic catalyst" includes any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," "multi-catalyst," and "bimodal" can be collectively referred to as a "mixed catalyst system."

The bimodal catalyst system may be supported on a carrier, typically an inorganic oxide or chloride or a resinous material such as, for example, polyethylene or silica.

Suitable metallocene catalysts particularly include the silica-supported hafnium transition metal metallocene/methylalumoxane catalyst systems described in, for example, U.S. Pat. Nos. 6,242,545 and 6,248,845, Example 1. Hafnium and zirconium transition metal metallocene-type catalyst systems are particularly suitable. Other particularly suitable metallocene catalysts include those metallocene catalysts and catalyst systems described in, U.S. Pat. Nos. 5,466,649; 6,476,171; 6,225,426, and 7,951,873.

Different catalysts including conventional-type transition metal catalysts are suitable for use in the polymerization processes of the methods disclosed herein. The following is a non-limiting discussion of the various polymerization catalysts useful. All numbers and references to the Periodic Table of Elements are based on the new notation as set out in Chemical and Engineering News, 63(5), 27 (1985), unless otherwise specified.

The transition metal compound may be described as a catalyst precursor, a transition metal catalyst, a polymerization catalyst, or a catalyst compound, and these terms are used interchangeably. The term activator is used interchangeably with the term co-catalyst. As used herein, "at least one catalyst system" refers to a combination comprising a catalyst compound and an activator capable of polymerizing monomers.

Conventional Catalysts

Conventional catalysts refer to Ziegler-Natta catalysts or Phillips-type chromium catalysts. Examples of conventional-type transition metal catalysts are discussed in U.S. Pat. Nos. 4,115,639, 4,077,904 4,482,687, 4,564,605, 4,721, 763, 4,879,359 and 4,960,741. The conventional catalyst compounds that may be used in the processes disclosed herein include transition metal compounds from Groups 3 to 10, preferably 4 to 6 of the Periodic Table of Elements.

These conventional-type transition metal catalysts may be represented by the formula:

$$MRx \qquad (I),$$

where M is a metal from Groups 3 to 10, Group 4, or titanium; R is a halogen or a hydrocarbyloxy group; and x is the valence of the metal M, preferably x is 1, 2, 3 or 4, or x is 4. Non-limiting examples of R include alkoxy, phenoxy, bromide, chloride and fluoride. Non-limiting examples of conventional-type transition metal catalysts where M is titanium include TiCl3, TiCl4, TiBr4, Ti(OC2H5)3Cl, Ti(OC2H5)Cl3, Ti(OC4H9)3Cl, Ti(OC3H7)2Cl2, Ti(OC2H5)2Br2, TiC3.1/3AlCl3 and Ti(OC12H25)Cl3.

Conventional chrome catalysts, often referred to as Phillips-type catalysts, may include CrO3, chromocene, silyl chromate, chromyl chloride (CrO2Cl2), chromium-2-ethylhexanoate, chromium acetylacetonate (Cr(AcAc)3). Non-limiting examples are disclosed in U.S. Pat. Nos. 2,285,721, 3,242,099 and 3,231,550.

For optimization, many conventional-type catalysts require at least one cocatalyst. A detailed discussion of cocatalysts may be found in U.S. Pat. No. 7,858,719, col. 6, line 46, bridging col. 7, line 45.

Metallocene Catalysts

Polymerization catalysts useful in the present methods include one or more metallocene compounds (also referred to herein as metallocenes or metallocene catalysts). Metallocene catalysts are generally described as containing one or more ligand(s) and one or more leaving group(s) bonded to at least one metal atom, optionally with at least one bridging group. The ligands are generally represented by one or more open, acyclic, or fused ring(s) or ring system(s) or a combination thereof. These ligands, preferably the ring(s) or ring system(s) are typically composed of one or more atoms selected from Groups 13 to 16 atoms of the Periodic Table of Elements; alternatively, the atoms may be selected from the group consisting of carbon, nitrogen, oxygen, silicon, sulfur, phosphorous, germanium, boron and aluminum or a combination thereof. The ring(s) or ring system(s) may be composed of carbon atoms such as, but not limited to, those cyclopentadienyl ligands or cyclopentadienyl-type ligand structures or other similar functioning ligand structures such as a pentadiene, a cyclooctatetraendiyl, or an imide ligand. The metal atom may be selected from Groups 3 through 15 and the lanthanide or actinide series of the Periodic Table of Elements. Alternatively, the metal may be a transition metal from Groups 4 through 12, alternatively Groups 4, 5 and 6, alternatively the transition metal is from Group 4.

Metallocene catalysts and catalyst systems are described in, for example, U.S. Pat. Nos. 4,530,914, 4,871,705, 4,937, 299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753, 5,770,664; EP-A-0 591756, EP-A-0 520-732, EP-A-0 420 436, EP-B1 0 485 822, EP-B1 0 485 823, EP-A2-0 743 324, EP-B1 0 518 092; WO 91/04257, WO 92/00333, WO 93/08221, WO 93/08199, WO 94/01471, WO 96/20233, WO 97/15582, WO 97/19959, WO 97/46567, WO 98/01455, WO 98/06759, and WO 98/011144.

Mixed Catalysts

As noted above, the bimodal catalyst system can include at least one metallocene catalyst component and at least one non-metallocene component (sometimes referred to as conventional catalyst component), or at least different two metallocene catalyst components, or two conventional catalysts components. As used herein, multi-modal catalyst systems mean and include a bimodal catalyst system or a tri-modal catalyst system. Further, the bimodal polymer product may be referred to as a multi-catalyst composition or system.

In an aspect of the methods disclosed herein, at least one catalyst system may comprise a mixed catalyst, i.e., two or more of the same or different types of catalysts, such as the ones described above. For example, a metallocene catalyst may be combined with one or more conventional catalysts or advanced catalysts, such as another metallocene catalyst.

Activator and Activation Methods

The above described polymerization catalysts, particularly, metallocene catalysts, are typically activated in various ways to yield polymerization catalysts having a vacant coordination site that will coordinate, insert, and polymerize olefin(s).

As used herein, the term "activator" refers to any compound that can activate any one of the polymerization catalyst compounds described herein by converting the neutral polymerization catalyst compound to a catalytically active catalyst cation compound. Non-limiting activators, for example, include alumoxane, aluminum alkyls, ionizing activators, which may be neutral or ionic, and conventional-type cocatalysts. A detailed discussion of activators and activation methods may be found in U.S. Pat. No. 7,858,719, col. 14, line 21, bridging col. 17, line 30.

Method for Supporting

The above described catalysts and catalyst systems may be combined with one or more support materials or carriers using a support method. In an aspect, at least one catalyst system is in a supported form.

As used herein, the terms "support" or "carrier" are used interchangeably and are any porous or non-porous support material, and may be a porous support material, for example, talc, inorganic oxides and inorganic chlorides, for example silica or alumina. Other carriers include resinous support materials such as polystyrene, a functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite and the like. Combinations of these support materials may be used, for example, silica-chromium and silica-titania.

Examples of supported metallocene catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,648,310, 5,665,665, 5,698,487, 5,714,424, 5,723,400, 5,723,402, 5,731,261, 5,743,202, 5,759,940, 5,767,032, 5,688,880, 5,770,755 and 5,770,664; WO 95/32995, WO 95/14044, WO 96/06187, WO96/11960, and WO96/00243.

Examples of supported conventional catalyst systems are described in U.S. Pat. Nos. 4,894,424, 4,376,062, 4,395,359, 4,379,759, 4,405,495, 4,540,758 and 5,096,869.

Polymerization Process

At least one of the catalyst systems described above is suitable for use in any gas phase polymerization process, including fluidized bed or stirred bed processes, and the gas phase polymerization process may be one in which one or more condensable agents as described below are utilized.

The catalyst feed may be introduced as pre-formed particles in one or more liquid carriers (i.e., a catalyst slurry). Suitable liquid carriers can include mineral oil be combined with special types of gels to improve the stability of the slurry to minimize the rate of solid settling, and/or liquid or gaseous hydrocarbons including, but not limited to, propane, butane, isopentane, hexene, heptane, octane, or mixtures thereof. A gas that is inert to the catalyst slurry such as, for example, nitrogen or argon can also be used to carry the catalyst slurry into the reactor. In an aspect, the catalyst can be a dry powder. In an aspect, the catalyst can be dissolved in a liquid carrier and introduced to the reactor as a solution.

Typically, in a gas phase polymerization process, a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of at least one catalyst system under polymerizable conditions. As used herein, "polymerizable conditions" refers to any and all process conditions and any and all equipment necessary and suitable to polymerize olefins into polyolefins. In an aspect, a condensable agent as described below, is introduced to the process for purposes of increasing the cooling capacity of the recycle stream. The purposeful introduction of a condensable agent into a gas phase process is referred to as a "condensed mode process" discussed in greater detail below. The gaseous stream is withdrawn from the fluidized bed and recycled back into the reactor. Simultaneously, polymer product is withdrawn from the reactor and fresh reactants including monomers are added to the reactor. See, for example, U.S. Pat. Nos. 4,543,399, 4,588,790, 5,028,670, 5,317,036, 5,352,749, 5,405,922, 5,436,304, 5,453,471, 5,462,999, 5,616,661 and 5,668,228.

Condensable Agent(s)

Condensable agents or fluids generally include hydrocarbons having little to no solvent power regarding the polymer product(s). Suitable condensing agents include C4-C8 hydrocarbons and mixtures thereof, preferably C4-C6 hydrocarbons and mixtures thereof, including linear, branched, cyclic, substituted hydrocarbons, as well as their respective isomers.

Condensed Mode Process

The condensing agent may be used in a gas phase polymerization process or simply a gas phase process. The gas phase process is operated in a condensed mode where a condensing agent as described above is introduced to the process to increase the cooling capacity of the recycle stream. The gas phase process is particularly well-suited for polymerizing one or more olefin(s), at least one of which may be ethylene or propylene, in a fluidized bed reactor, the process operating in a condensed mode in which a liquid and a gas are introduced to the fluidized bed reactor having a fluidizing medium or a stirred bed reactor having a medium, wherein the level of condensable fluid, is greater than 5 weight percent, alternatively, greater than 10 weight percent, or greater than 15 weight percent or greater than 20 weight percent, alternatively greater than 25 weight percent, alternatively greater than 30 weight percent, alternatively greater than 35 weight percent, and alternatively greater than 30 weight percent up to 60 weight percent, alternatively 50 weight percent, 55 weight percent, 60 weight percent, 65 weight percent, 70 weight percent, 75 weight percent, 80 weight percent, 85 weight percent, 90 weight percent, 91 weight percent, 92 weight percent, 95 weight percent, 96 weight percent, 97 weight percent, 98 weight percent, or 99 weight percent, based on the total weight of the liquid and gas entering the reactor. For further details of a condensed mode process see, for example, U.S. Pat. Nos. 5,342,749 and 5,436,304.

In an aspect, the methods disclosed herein are directed to a process, preferably a continuous process, for polymerizing monomer(s) in a reactor, said process comprising the steps of: (a) introducing a recycle stream into the reactor, the recycle stream comprising one or more monomer(s); (b) introducing a polymerization catalyst and a condensable fluid into the reactor; (c) withdrawing the recycle stream from the reactor; (d) cooling the recycle stream to form a gas phase and a liquid phase; (e) reintroducing the gas phase and the liquid phase into the reactor; (f) introducing into the reactor additional monomer(s) to replace the monomer(s) polymerized; and (g) withdrawing a polymer product from the reactor. In an aspect, the condensable fluid is introduced in amounts greater than 10 weight percent or greater than 15 weight percent or greater than 20 weight percent, alternatively greater than 25 weight percent, alternatively greater than 30 weight percent or greater than 35 weight percent, and alternatively greater than 40 weight percent based on the total weight of fluidizing medium being reintroduced into the reactor.

Reactor Conditions

The reactor pressure in any of the gas phase processes described above varies from about 100 psig (690 kPa) to about 500 psig (3448 kPa), alternatively, in the range of from about 200 psig (1379 kPa) to about 400 psig (2759 kPa), and alternatively in the range of from about 250 psig (1724 kPa) to about 350 psig (2414 kPa).

The reactor temperature in any of the gas phase processes described above varies from about 30° C. to about 120° C., alternatively from about 60° C. to about 115° C., alternatively in the range of from about 70° C. to 110° C., and alternatively in the range of from about 70° C. to about 100° C. In an aspect, the polymerization temperature is above ambient temperature (23° C.), alternatively above 30° C., alternatively above 50° C., alternatively above 70° C.

The methods disclosed herein can produce greater than 1 lbs. of polymer per hour (0.454 Kg/hr.) to about 200,000 lbs./hr. (90,900 Kg/hr.) or higher of polymer, alternatively greater than 1000 lbs./hr. (455 Kg/hr.), alternatively greater than 10,000 lbs./hr. (4540 Kg/hr.), alternatively greater than 25,000 lbs./hr. (11,300 Kg/hr.), alternatively greater than 35,000 lbs./hr. (15,900 Kg/hr.), alternatively greater than 100,000 lbs./hr. (45,500 Kg/hr.), and alternatively greater than 65,000 lbs./hr. (29,000 Kg/hr.) to greater than 200,000 lbs./hr. (90,700 Kg/hr.).

Monomers and Polymers

Polymers produced in accordance with the methods disclosed herein are olefin polymers or "polyolefins". As used herein, "olefin polymers" or "polyolefins" refers to at least 75 mole % of the polymer is derived from hydrocarbon monomers, alternatively at least 80 mole %, alternatively at least 85 mole %, alternatively at least 90 mole %, alternatively at least 95 mole %, and alternatively at least 99 mole %. Hydrocarbon monomers are monomers made up of only carbon and hydrogen. For example, the monomers to be polymerized are aliphatic or alicyclic hydrocarbons (as defined under "Hydrocarbon" in Hawley's Condensed Chemical Dictionary, 13th edition, R. J. Lewis ed., John Wiley and Sons, New York, 1997). In an aspect, the monomers to be polymerized are linear or branched alpha-olefins, alternatively C2 to C40 linear or branched alpha-olefins, alternatively C2 to C20 linear or branched alpha-olefins, e.g., ethylene, propylene, butene, pentene, hexene, heptene, octene, nonene, decene, undecene, dodecene, or mixtures thereof. Well-suited monomers include two or more olefin monomers of ethylene, propylene, butene-1, pentene-1,4-methyl-pentene-1, hexene-1, octene-1, decene-1, and mixtures thereof.

Other monomers include ethylenically unsaturated monomers, diolefins having 4 to 18 carbon atoms, conjugated or nonconjugated dienes, polyenes, vinyl monomers and cyclic olefins. Non-limiting monomers include butadiene, norbornene, norbornadiene, isobutylene, vinylbenzocyclobutane, ethylidene norbornene, isoprene, dicyclopentadiene and cyclopentene.

In an aspect, ethylene or propylene is polymerized with at least two different comonomers, optionally, one of which may be a diene, to form a terpolymer.

The polymers produced by the methods disclosed herein are useful in making a wide variety of products and useful in many end-use applications. The polymers include low density polyethylenes, linear low density polyethylenes, medium density polyethylene, and high density polyethylenes.

The polymers produced, typically polyethylene polymers, may have a density in the range of from 0.860 g/cc to 0.970 g/cc, alternatively in the range of from 0.880 g/cc to 0.965 g/cc, alternatively in the range of from 0.900 g/cc to 0.960 g/cc, alternatively in the range of from 0.905 g/cc to 0.950 g/cc, alternatively in the range from 0.910 g/cc to 0.940 g/cc, and alternatively greater than 0.912 g/cc.

In an aspect, the polymers produced by the methods disclosed herein typically have a molecular weight distribution, a weight average molecular weight to number average molecular weight (Mw/Mn) of about 1.5 to about 30, particularly about 2 to about 15, alternatively about 2 to about 10, alternatively about 2.2 to less than about 8, and alternatively from about 2.5 to about 8. The ratio of Mw/Mn is measured by gel permeation chromatography techniques.

In an aspect, the polyethylene polymers typically have a narrow or broad composition distribution as measured by Composition Distribution Breadth Index (CDBI). See, for example, WO 93/03093. CDBIs may be generally in the range of greater than 50% to 99%, alternatively in the range of 55% to 85%, and alternatively 60% to 80%, alternatively greater than 60%, and alternatively greater than 65%. Alternatively, CDBI's may be generally less than 50%, alternatively less than 40%, and alternatively less than 30%.

Polyethylene polymers may have a melt index (MI) or (I2) as measured by ASTM-D-1238-E in the range from 0.01 dg/min to 1000 dg/min, alternatively from about 0.01 dg/min to about 100 dg/min, alternatively from about 0.1 dg/min to about 50 dg/min, and alternatively from about 0.1 dg/min to about 10 dg/min. The polyethylene polymers may have a melt index ratio (I21.6/I2.16 or for shorthand "I21/I2") (measured by ASTM-D-1238-F) of from 10 to less than 25, alternatively from about 15 to less than 25. Further, in an aspect, the polymers have a melt index ratio (I21/I2) of greater than 25, alternatively greater than 30, alternatively greater than 40, alternatively greater than 50 and alternatively greater than 65. Alternatively, the polyethylene polymers may have a melt index ratio (I21/I2) in the range of from 15 to 40, alternatively in the range of from about 20 to about 35, alternatively in the range of from about 22 to about 30, and alternatively in the range of from 24 to 27.

In an aspect, propylene polymers (referred to also as propylene-based polymers) may be produced. These polymers include without limitation atactic polypropylene, isotactic polypropylene, and syndiotactic polypropylene. Other propylene polymers include propylene random, block or impact copolymers.

Polymers produced are useful in forming a variety of articles. Such articles include without limitation films, sheets, and fibers. The articles may be produced by extrusion and co-extrusion as well as blow molding, injection molding, and rotational molding. Films include blown or cast films formed by coextrusion or by lamination, shrink films, cling films, stretch films, sealing films, and oriented films. The films are useful in packaging, heavy duty bags, grocery sacks, food packaging, medical packaging, industrial liners, geo-membranes, etc. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers, playground equipment, toys, etc.

It is to be understood that while the invention has been described in conjunction with the specific embodiments thereof, the foregoing description is intended to illustrate and not limit the scope of the invention. An aspect, advantages and modifications will be apparent to those skilled in the art to whom the invention pertains.

Therefore, the following prophetic example is put forth so as to provide those skilled in the art with a complete disclosure and description and are not intended to limit the scope of that which the inventors regard as their invention.

Example I

A set of operating conditions were first determined in a pilot plant using a single catalyst system to achieve product having a particular melt index and density. The pilot plant was then transitioned from a single catalyst system to a bimodal catalyst system and several product runs were performed to produce product with similar melt index and density and at a similar temperature as in the single catalyst system. Table 1 lists the operating conditions.

Subsequently, in a commercial reactor scale-up trial, the same single catalyst system used in the pilot plant run (Table 1) was already running. The commercial reactor was then transitioned to a bimodal catalyst system at similar operating temperatures to the pilot plant (as provided in Table 1) to achieve product having a similar melt index and density as shown in Table 2.

TABLE I

Pilot Plant Runs

| Pilot plant part number | single catalyst | bimodal catalyst | bimodal catalyst |
|---|---|---|---|
| Melt Index | 1.01 | 1.03 | 0.88 |
| Melt Index Ratio | 22.8 | 34.3 | 32.6 |
| Density (g/cc) | 0.9199 | 0.9206 | 0.9191 |
| Bed Temperature (° F.) | 185.0 | 178.0 | 181.0 |
| Reactor Pressure (psig) | 300.0 | 290.0 | 300.0 |
| Ethylene partial pressure (psia) | 221 | 200 | 220 |
| H2/C2 = gas ratio (ppm/mol %) | 5.16 | 5.95 | 6.05 |
| C6 =/C2 = gas ratio (mol/mol) | 0.013 | 0.017 | 0.017 |
| C6 =/C2 = flow ratio (lb/lb) | 0.068 | 0.089 | 0.087 |
| iC5 (mol %) | 11.6 | 11.9 | 11.5 |
| Residence time (hours) | 5.2 | 5.6 | 3.0 |

TABLE 2

Commercial Reactor Scale-Up Trial

| Condition | single catalyst | bimodal catalyst |
|---|---|---|
| Melt Index | 1.01 | 0.93 |
| Melt Index Ratio | 26.3 | 35.0 |
| Density (g/cc) | 0.9195 | 0.9198 |
| Bed Temperature (° F.) | 177.8 | 177.8 |
| Reactor Pressure (psig) | ~290 | ~290 |
| Ethylene partial pressure (psia) | ~200 | ~200 |
| H2/C2 = gas ratio (ppm/mol %) | 5.16 | 6.25 |
| C6 =/C2 = gas ratio (mol/mol) | 0.014 | 0.016 |
| C6 =/C2 = flow ratio (lb/lb) | 0.091 | 0.100 |
| iC5 (mol %) | ~10 | ~10 |
| Residence time (hours) | ~2.7 | ~2.8 |

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of aspects and examples, those skilled in the art, having benefit of this disclosure, will appreciate that other embodiments can be devised which do not depart from the scope and spirit of the invention as disclosed herein.

We claim:

1. A method for scale-up from a pilot plant to a larger production facility of a bimodal polymer product having a density and a melt index comprising the steps of:
    producing a bimodal polymer product in a first reactor in a pilot plant with a bimodal catalyst system under a first set of operating conditions, wherein the bimodal catalyst system comprises a first catalyst component and a second catalyst component and the bimodal polymer product has a bimodal polymer product density and a bimodal polymer product melt index;
    producing a single catalyst polymer composition in the first reactor in the pilot plant with a single catalyst system under a second set of operating conditions, wherein the single catalyst polymer composition has a single catalyst polymer composition density and a single catalyst polymer composition melt index, and the single catalyst polymer composition is produced in the first reactor before or after the step of producing the bimodal polymer product in the first reactor;

producing the single catalyst polymer composition in a second reactor in a full-scale process plant with the single catalyst system, wherein the second set of operating conditions to produce the single catalyst polymer composition are adjusted to provide a third set of operating conditions;

determining a fourth set of operating conditions, wherein a third ratio of each operating condition of the fourth set of operating conditions to each of the operating conditions of the first set of operating conditions equals the product of a first ratio of the operating condition of the third set of operating conditions to the operating condition of the second set of operating conditions and a second ratio of the operating condition of the first set of operating conditions to the operating condition of the second set of operating conditions; and transitioning the second reactor from the single catalyst system to the bimodal catalyst system under a fourth set of operating conditions to produce the bimodal polymer product;

wherein the first set of operating conditions includes one or more of the following:
a H2/C2 reactor gas ratio;
a C6/C2 reactor feed ratio;
a reactor residence time, wherein the reactor residence time is weight of polymer in the reactor divided by production rate of bimodal polymer product; and
an induced condensing agent (ICA) concentration.

2. The method of claim 1, further comprising the step of adjusting the amounts of the first catalyst component and the second catalyst component to produce the bimodal polymer product.

3. A method for scale-up from a pilot plant to full production of a bimodal polymer product having a density and a melt index comprising the steps of:

determining a first set of operating conditions to produce the bimodal polymer product in a first reactor in the pilot plant with a bimodal catalyst system, wherein the bimodal catalyst system comprises a first catalyst component and a second catalyst component and the bimodal polymer product has a bimodal polymer product density and a bimodal polymer product melt index;

determining a second set of operating conditions to produce a single catalyst polymer composition in a first reactor in the pilot plant with single catalyst system, wherein the single catalyst polymer composition has a single catalyst polymer product density and a single catalyst polymer product melt index;

scaling-up the production of the bimodal polymer product from the pilot plant to a full-scale process plant, wherein the full-scale process plant having a second reactor that uses the single catalyst system under the second set of operating conditions, and the second set of operating conditions are modified to a third set of operating conditions to produce the single catalyst polymer composition;

transitioning the second reactor from the single catalyst system to the bimodal catalyst system to produce the bimodal polymer product under the fourth set of operating conditions, wherein a third ratio of each of the operating conditions of the fourth set of operating conditions to each of the operating conditions of the first set of operating conditions equals the product of a first ratio of the operating condition of the third set of operating conditions to the operating condition of the second set of operating conditions and a second ratio of the operating condition of the first set of operating conditions to the operating condition of the second set of operating conditions; and adjusting the ratio of the first catalyst component to the second catalyst component to maintain the bimodal polymer product melt index and the bimodal polymer product density;

wherein the first set of operating conditions includes one or more of the following:
a H2/C2 reactor gas ratio;
a C6/C2 reactor feed ratio;
a reactor residence time, wherein the reactor residence time is weight of polymer in the reactor divided by production rate of bimodal polymer product; and
an induced condensing agent (ICA) concentration.

4. The method of claim 1, wherein the single catalyst polymer composition has a single catalyst composition density and a single catalyst composition melt index, and the single catalyst composition density is the same as the bimodal product density and the single catalyst composition melt index is the same as the bimodal product melt index; and further wherein the ratio of the first catalyst component to the second catalyst component can be adjusted to maintain the melt index and density of the bimodal polymer product.

5. The method of claim 3 wherein the single catalyst polymer composition has a single catalyst composition density and a single catalyst composition melt index, and the single catalyst composition density is the same as the bimodal product density and the single catalyst composition melt index is the same as the bimodal product melt index; and further wherein the ratio of the first catalyst component to the second catalyst component can be adjusted to maintain the melt index and density of the bimodal polymer product.

6. A method for scale-up from a pilot plant to full production of a bimodal polymer product having a density and a melt index comprising the steps of:

determining a first set of operating conditions in a first reactor in the pilot plant with a single catalyst system to produce a single catalyst polymer composition, wherein the single catalyst system comprises a metallocene catalyst;

transitioning the first reactor from the single catalyst system to a bimodal catalyst system under a second set of operating conditions to produce a bimodal polymer product, wherein the bimodal catalyst system comprises two metallocene catalysts and the melt index and density of the single catalyst polymer composition is the same as the bimodal polymer product;

scaling-up the production of the polymer product from the pilot plant to a full-scale process plant under the first set of operating conditions, wherein the full-scale process plant having a second reactor that uses the single catalyst system;

adjusting the first set of operating conditions and determining an offset; and transitioning the second reactor from the single catalyst system to the bimodal catalyst system to produce the bimodal polymer product with the offset in the first set of operating conditions;

wherein the first set of operating conditions includes one or more of the following:
a H2/C2 reactor gas ratio;
a C6/C2 reactor feed ratio;
a reactor residence time, wherein the reactor residence time is weight of polymer in the reactor divided by production rate of bimodal polymer product; and
an induced condensing agent (ICA) concentration.

7. The method of claim 1, further comprising the step of adjusting a C6/C2 reactor gas ratio and/or C6/C2 reactor feed ratio during the step of transitioning the first reactor from the bimodal catalyst system to a single catalyst system under the first set of operating conditions to produce a first polymer composition.

8. The method of claim 1, wherein the first catalyst component and/or the second catalyst component is a metallocene catalyst.

9. The method of claim 1, wherein the first catalyst component and/or second catalyst component is a conventional-type catalyst.

10. The method of claim 1, wherein the single catalyst system comprises a conventional type catalyst or a metallocene catalyst.

11. The method of claim 1, wherein the bimodal polymer product is a polyethylene based polymer.

12. The method of claim 1, wherein the bimodal polymer product is a polypropylene based polymer.

13. The method of claim 1, wherein the bimodal polymer product is a linear low density polyethylene based polymer.

14. The method of claim 1, wherein the first reactor and/or the second reactor is a solution phase reactor, a high pressure reactor and/or a slurry reactor.

15. The method of claim 1, wherein the first reactor and/or the second reactor is a gas phase reactor.

16. The method of claim 1, wherein the bimodal catalyst system comprises a metallocene catalyst and a conventional-type catalyst.

17. A method for transitioning production of a bimodal polymer product, having a density and a melt index, from a first commercial reactor to a second commercial reactor, wherein each of the method steps of claim 1 are applied to a transition from a first commercial reactor to a second commercial reactor.

* * * * *